Oct. 20, 1936.                J. W. LOGAN, JR                2,058,024
                              EDDY CURRENT BRAKE
                             Filed Dec. 11, 1934
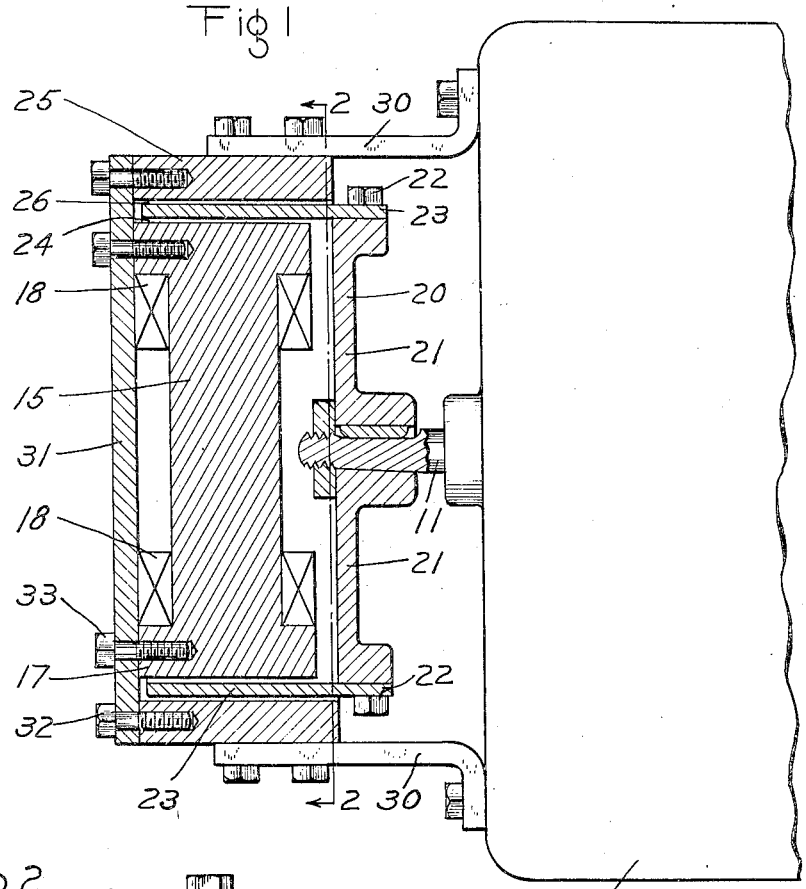
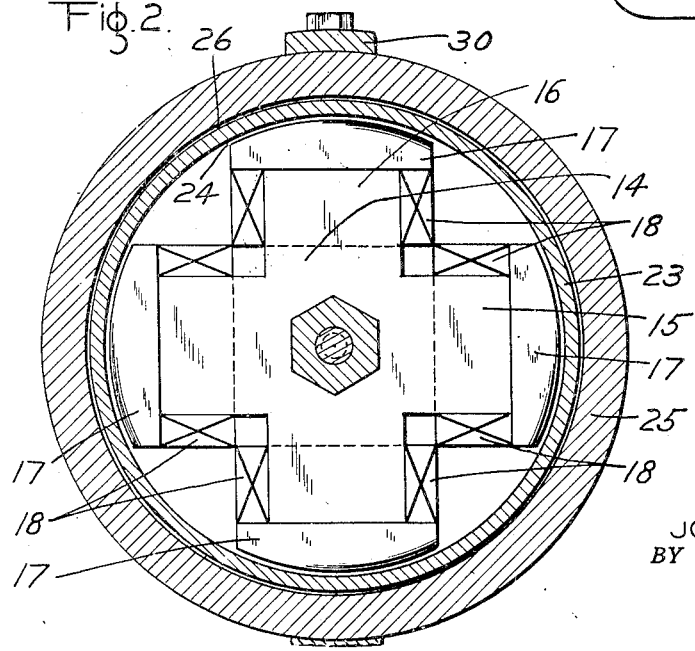
INVENTOR
JOHN W. LOGAN, JR.
BY
ATTORNEY Patented Oct. 20, 1936

2,058,024

UNITED STATES PATENT OFFICE 2,058,024

EDDY CURRENT BRAKE

John W. Logan, Jr., Edgewood, Pa., assignor to The Westinghouse Air Brake Company, Wilmerding, Pa., a corporation of Pennsylvania Application December 11, 1934, Serial No. 756,920

1 Claim. (Cl. 188—104)

This invention relates to a brake and more particularly to an electrodynamic brake of the eddy current type adapted for use on vehicles.

It is a general object of this invention to provide an improved brake of the eddy current type and which will develop a relatively constant braking effect over a greater part of the deceleration period when bringing a vehicle or other moving element to a stop.

Another object of the invention is to provide a brake of the eddy current type having a rotor constructed of magnetic material but which is relatively light in weight so that the inertia of the rotating mass is relatively small.

A further object of the invention is to provide a brake of the eddy current type having a rotor constructed of magnetic material and in which the braking effectiveness is independent of the size of the rotor employed.

Another object of the invention is to provide a brake of the eddy current type having a rotor constructed of magnetic material and operating between a stator adapted to produce a magnetic flux and a ferrous magnetic return circuit.

A further object of the invention is to provide an improved brake of the eddy current type which can be constructed easily and at small cost.

Other objects of the invention and features of novelty will be apparent from the following description taken in connection with the accompanying drawing in which Figure 1 is a sectional view of one embodiment of the eddy current brake provided by my invention, and Figure 2 is a sectional view taken substantially along the line 2—2 of Figure 1.

Referring to the drawing, I have illustrated one embodiment of the eddy current brake provided by my invention. This brake may be mounted in any desired manner relative to the element which is controlled by the brake, and, in the form of the invention illustrated in the drawing, I have illustrated the brake mounted on the end of one of the driving motors 10 of a traction vehicle, the rotor of the brake being mounted on an extension of the armature shaft 11 of the motor and being driven thereby so that the rotor is rotated in accordance with the speed of the vehicle.

As shown in the drawing, the eddy current brake comprises an electromagnet indicated generally by the reference character 14, and comprising a plurality of core sections including a magnetic core member 15 having a plurality of arms 16 which terminate in pole pieces 17, the pole pieces 17 having faces of a configuration corresponding to the inner periphery of the rotor. The electromagnet 14 is provided with windings 18 disposed on, and insulated from the magnetic core member 15. The windings 18 are arranged on the pole pieces so that alternate pole pieces are of opposite polarity.

The rotor, which is indicated generally by the reference character 20, is provided with a hub portion 21 constructed of a suitable non-magnetic material, such as bronze, and adapted to be secured on the end of the armature shaft 11 of the driving motor 10. The hub portion 21 has secured thereto in any suitable manner, as by bolts 22, an annular, substantially cylindrical, member 23 constructed of a suitable magnetic material. The annular member 23 projects axially from the hub portion 21 and substantially encloses the electromagnet 14, the member 23 being of such a diameter that air gaps 24 are provided between the rotor and the faces of the pole pieces 17.

Means is provided to carry the magnetic flux from one pole piece of the electromagnet to an adjacent pole piece and this means comprises a member 25 which may be considered as a section of the core of the electromagnet 14 and which is constructed of magnetic material, and, as shown in the drawing, is a substantially cylindrical member enclosing the annular portion 23 of the rotor. The member 25 is supported so as to closely surround the member 23 leaving an air gap 26 between it and the rotor. The member 25 is of an axial width substantially as great, or greater, than the axial width of the pole pieces 17 of the electromagnet 14 and its radial depth is preferably somewhat greater than the radial thickness of the member 23. The member 25 is preferably large enough so that it will readily transmit between adjacent pole pieces of the electromagnet, the flux produced by the electromagnet.

The member 25 is mounted concentrically relative to the rotor 20, and may be supported in any suitable manner, as by means of brackets 30 which are secured to the end of the driving motor 10. A supporting plate 31 constructed of any suitable non-magnetic material, such as bronze, is secured to the axially outer face of the member 25 by means of cap screws 32 and has secured to it by means of cap screws 33, the core 15 of the electromagnetic 14, so that the magnet is also held in concentric relation to the rotor 20.

In operation, when the vehicle is moving the rotor 20 is rotated. When it is desired to effect an application of the brakes, current is supplied to the winding, which upon being energized establishes a magnetic flux having its main paths through the arms 16 of the core 15, out alternate pole pieces 17, across the air gaps between the faces of the pole pieces 17 and the member 25 and around the member 25 to the adjacent pole pieces. The cylindrical portion 23 of the rotor 20 extends between the faces of the pole pieces 17 and the member 25 and cuts across the flux which flows through the gap between the pole pieces and the member 25 so that currents are produced in the rotor which react with the magnetic flux producing them to oppose or retard the rotation of the rotor and hence produce a braking effect on the rotor and the member driving it.

It will be seen that in the brake provided by my invention an exterior magnetic member is provided to carry the flux between adjacent poles of the electromagnet and that the flow of magnetic flux is not confined to the rotor in passing from one pole to an adjacent pole. In the eddy current brakes heretofore used the rotor was employed to carry the flux between adjacent poles of the electromagnet and the rotor had to be made relatively thick in order to have sufficient carrying capacity with the result that because of its relatively large mass it had a relatively high inertia, making necessary excess power for accelerating the rotary parts and also reducing the effectiveness of the brake because of the necessity of removing energy stored in the relatively heavy rotating parts. In the brake provided by my invention the magnetic flux is carried between adjacent pole pieces of the electromagnet by the exterior ferrous magnetic circuit and the rotor therefore may be relatively thin and light in weight so that its mass and inertia are greatly reduced, thereby reducing the power required for acceleration and also increasing the effectiveness of the brake.

From the foregoing it will be seen that I have provided an improved brake of the eddy current type which will develop a relatively constant braking effect over the greater part of the deceleration period and which employs a rotor constructed of magnetic material, but which is relatively light weight so that inertia of the rotating mass is relatively small. It will also be seen that the eddy current brake provided by this invention has a rotor constructed of magnetic material and that the braking effectiveness of the brake is independent of the mass or thickness of the rotor employed.

While one embodiment of the improved brake provided by my invention has been illustrated and described in detail it should be understood that the invention is not limited to these details of construction and that numerous changes and modifications may be made without departing from the scope of the following claim.

Having now described my invention, what I claim as new and desire to secure by Letters Patent, is:

In an eddy current brake adapted for use in retarding the armature of an electric motor, the brake comprising an annular exterior core section having means associated therewith for securing the core section to the frame of an electric motor substantially concentrically relative to the motor armature shaft, another core section positioned within the first core section and detachably supported from the first core section in substantially concentric relation thereto through a member constructed of non-magnetic material, the second core section comprising a plurality of pole pieces having faces disposed adjacent to but spaced from the first core section, the pole pieces having windings associated therewith and adapted when energized to produce a magnetic flux in the region of the faces of the pole pieces, adjacent poles being of opposite polarity, and a rotor comprising a hub constructed of non-magnetic material and adapted to be secured on the armature shaft of the motor and a substantially cylindrical portion constructed of magnetic material, said cylindrical portion being secured to the hub portion and extending between the faces of the pole pieces and the first core section.

JOHN W. LOGAN, Jr.